United States Patent [19]

Kawabata

[11] Patent Number: 4,759,448
[45] Date of Patent: Jul. 26, 1988

[54] APPARATUS FOR IDENTIFYING AND STORING DOCUMENTS

[75] Inventor: Akio Kawabata, Gunma, Japan

[73] Assignee: Sanden Corporation, Gunma, Japan

[21] Appl. No.: 932,048

[22] Filed: Nov. 18, 1986

[30] Foreign Application Priority Data

Nov. 18, 1985 [JP] Japan .................... 60-256668
Nov. 18, 1985 [JP] Japan .................... 60-256669
Nov. 18, 1985 [JP] Japan .................... 60-256670

[51] Int. Cl.⁴ .................... B07C 5/38; B65H 29/46
[52] U.S. Cl. .................... 209/551; 209/534; 271/177; 271/189; 271/294
[58] Field of Search .................... 209/534, 551, 706; 194/206, 207; 271/177, 180, 181, 189, 209, 292, 294

[56] References Cited

U.S. PATENT DOCUMENTS

| | | | |
|---|---|---|---|
| 3,266,798 | 8/1966 | Bleiman | 271/181 X |
| 3,301,554 | 1/1967 | Voss | 271/177 |
| 3,655,186 | 4/1972 | Bayha | 271/180 |
| 3,917,260 | 11/1975 | Okkonen et al. | 271/181 |
| 4,418,824 | 12/1983 | Gorgone et al. | 209/534 |
| 4,512,263 | 4/1985 | Lanning | 271/181 X |

FOREIGN PATENT DOCUMENTS

| | | | |
|---|---|---|---|
| 2453811 | 12/1980 | France | 194/207 |
| 52-27700 | 3/1977 | Japan | 194/206 |
| 54-58494 | 5/1979 | Japan | 271/180 |
| 59-64469 | 4/1984 | Japan | 271/181 |
| 60-673 | 1/1985 | Japan . | |
| 1556356 | 11/1979 | United Kingdom | 271/177 |

*Primary Examiner*—Robert B. Reeves
*Assistant Examiner*—Edward M. Wacyra
*Attorney, Agent, or Firm*—Finnegan, Henderson, Farabow, Garrett & Dunner

[57] ABSTRACT

Apparatus for identifying and storing documents of two different types according to those types, each document including indicia corresponding to the document type, comprising: a receiver for receiving documents to be identified and stored; an identifying mechanism for identifying the type of document received by the receiver as one of the two types; a conveyor responsive to the identifying mechanism for conveying documents to be stored to one of two loading positions corresponding to each of the two types; a stationary loading device positioned adjacent each loading position; and a movable container including a storage space corresponding to each of the two types for forcing a document to be stored from one of the loading positions into one of the storage spaces when the container is moved toward the document.

9 Claims, 5 Drawing Sheets

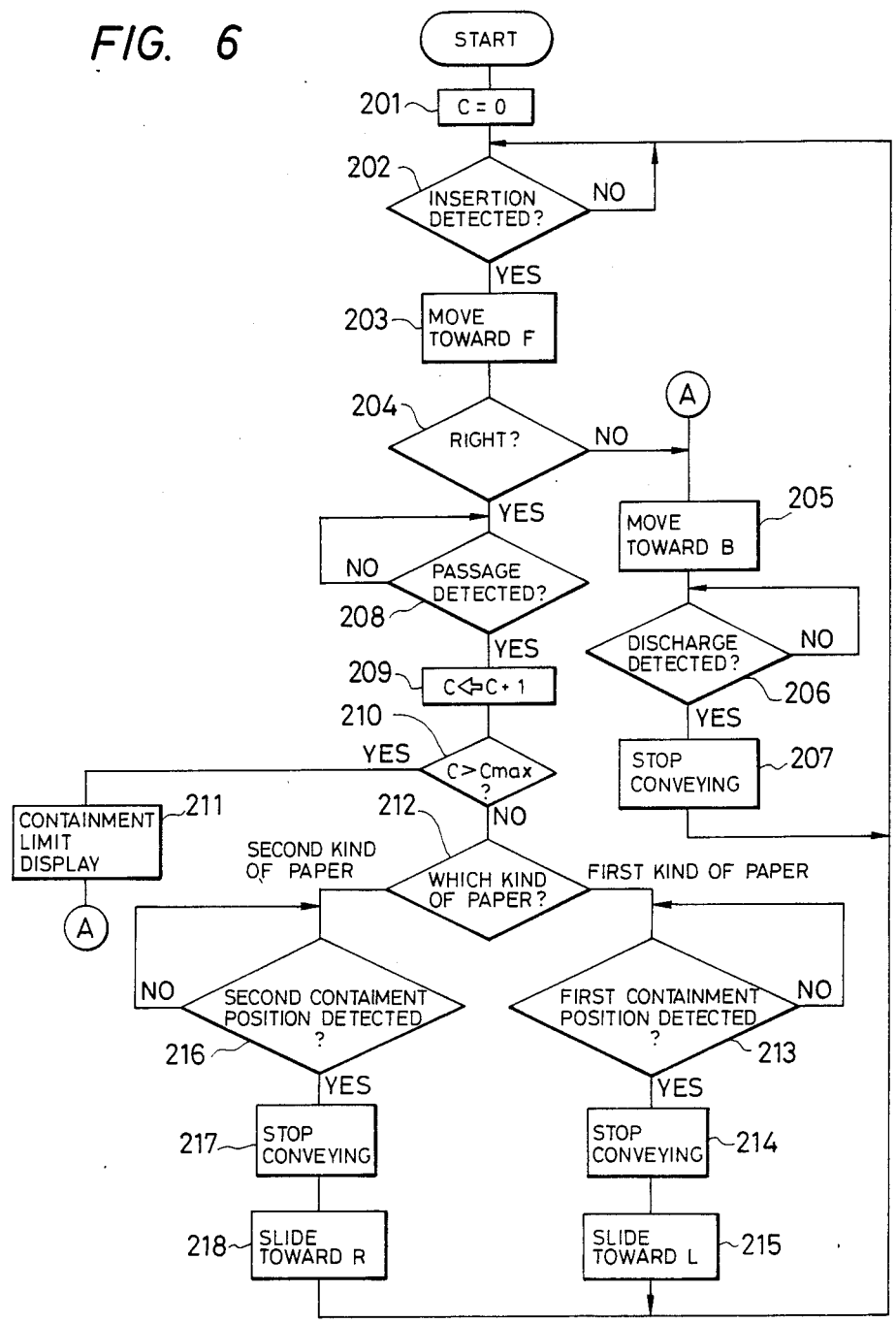

APPARATUS FOR IDENTIFYING AND STORING DOCUMENTS

BACKGROUND OF THE INVENTION

This invention relates to an apparatus for identifying and storing documents.

A conventional apparatus for identifying and storing two kinds of documents must be equipped with two container boxes, one for each kinds. Such an apparatus therefor must be deactivated when the fixed document storage space of one box is full, even though the other container may have space in reserve.

An apparatus for identifying and storing documents of the type disclosed by, e.g., Japanese Patent Application Publication (OPI) No. 673/85 solves this problem. That apparatus comprises a container box having openings on its sides facing each other, the box is equipped with a pair of partitions installed therein and so energized as to drift away from each other toward the respective openings. In the apparatus thus proposed, the documents inserted through an inlet are identified by an identifying means and the documents thus inserted and identified are sorted by a sorting mechanism and transferred to one of two receiver units. When the document is received by either receiver unit, a push member is reciprocated to force the document into the container box through the opening. On the back surface of each partition is detecting means for detecting when the space between the two partitions has reached predetermined limit indicating that one of the storage spaces is full.

Apparatus for identifying and storing documents with separate container boxes, each containing prescribed types of documents or with one container box, as proposed above, must be equipped with a pair of push members and driving means to force the documents into each container box. This makes such apparatus complicated to construct, overly large and too expensive.

In the apparatus with one container box, in particular, the sorting mechanism and the means for driving the sorting mechanism made the apparatus too large, and too complicated and expensive.

In the case of the apparatus for identifying and storing documents with one container box, as proposed above, the means for detecting the full condition are arranged on the back surfaces of the partitions installed in the container box. As a consequence, energizing means must be included to provide a strong energizing force for pushing the partitions away from each other. The push members for forcing documents into the container box need to overcome this strong energizing force, so the means for driving the push members must be large. In addition to the above drawbacks, the moving partitions are subjected to shocks every time a document is inserted into the container box. Thus, the detecting means may fail or break loose due to such shocks.

SUMMARY OF THE INVENTION

Accordingly, it is an object of the present invention to make a more compact document storing apparatus.

Another object of the invention is to reduce the member of moving parts in a document storing apparatus.

A further object of the invention is to quickly store documents without the need for complicated sorting devices.

Additional objects and advantages will be obvious from the description which follows, or may be learned by practice of the invention.

To achieve the foregoing objects and advantages, the document identifying and storing apparatus of the present invention is for identifying and storing documents of two different types according to those types, each document including indicia corresponding to the document type. The apparatus comprises receiving means for receiving documents to be identified and stored; identifying means for identifying the type of document received by the receiving means as one of the two types; conveying means responsive to the identifying means for conveying documents to be stored to one of two loading positions corresponding to each of the two types; stationary loading means positioned adjacent each loading position; and movable container means including a storage space corresponding to each of the two types for forcing a document to be stored from one of the loading positions into one of storage spaces when the container means is moved toward the document.

Preferably, the container means includes a pair of wall members defining an enclosed storage area, the wall members having openings therein corresponding to the two loading positions, and a pair of partitions for separating the storage area into the two separate storage spaces. It is also preferred that the container means include means for biasing the partitions away from each other.

Preferably, the wall members each include a pair of projections for holding documents in the storage spaces against the bias of the biasing means. Each of the wall members also may include a pair of ribs for holding a document to be stored in one of the loading positions.

Preferably, the container means includes drive means for moving the container means toward the loading means for forcing a document in one of the loading positions into one of the storage spaces. The conveying means may include first and second substantially parallel passageways and a curved connecting passageway the first passageway including an opening corresponding to one loading position, and the second passageway including an opening corresponding to the other loading position.

It is preferred that the apparatus also include detecting means for counting the number of documents conveyed to each of the loading positions, and decision means for generating a limit signal when the number of documents reaches a predetermined level. The detecting means may include detection pulse means for generating a pulse signal when each document is conveyed to one of the loading positions, and counting means for counting the detection pulses from the pulse means.

BRIEF DESCRIPTION OF THE DRAWINGS

The accompanying drawings, which are incorporated in and constitute a part of the specification, illustrate one embodiment of the invention, and, together with the description, serve to explain the principles of the invention.

Of the drawings:

FIG. 6 is a flowchart showing an example of the operation of the control device of FIG. 5.

DETAILED DESCRIPTION OF THE PREFERRED EMBODIMENT

Figure 1:
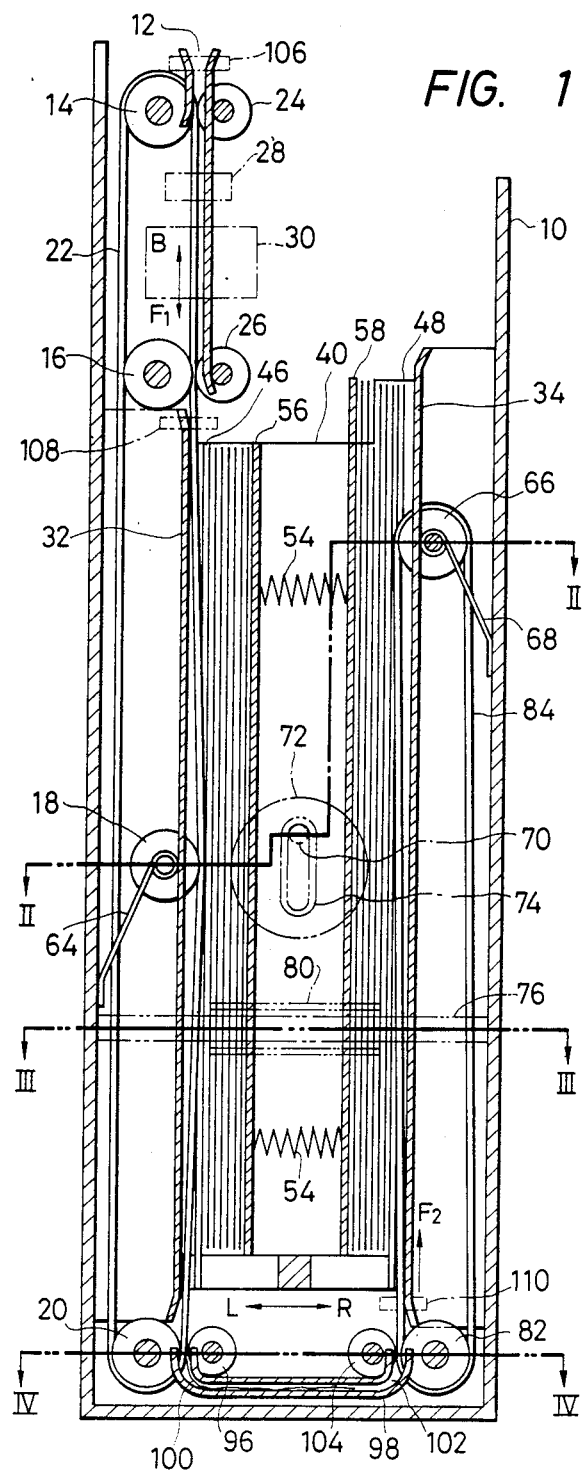
FIG. 1 is a vertical sectional view taken along a line I—I of FIGS. 2 through 4 showing the construction of an apparatus for identifying and storing documents embodying the present invention.

Referring now to the drawings, a preferred embodiment of the present invention will be described.

Figure 2:
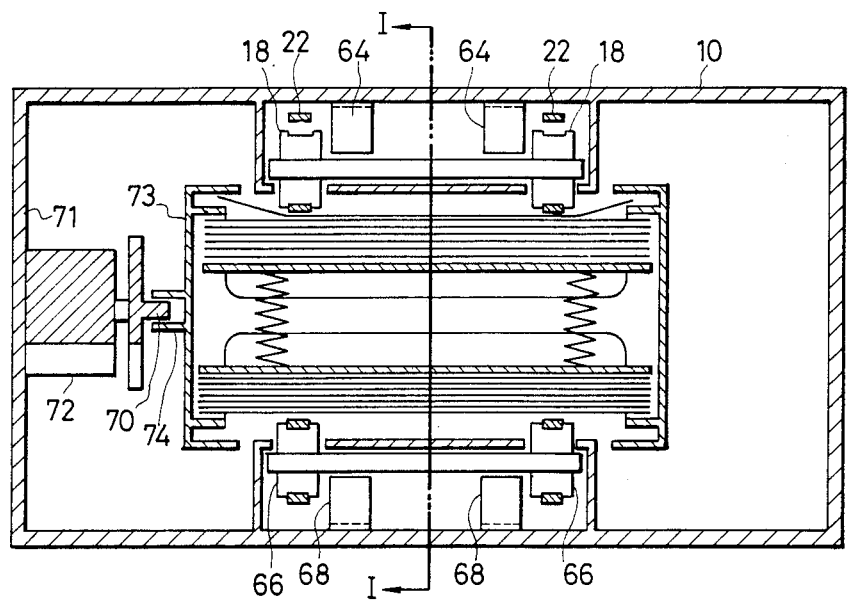
FIGS. 2, 3 and 4 are transverse sectional views taken along lines II—II, III—III and IV—IV of FIG. 1, respectively.
Figure 3:
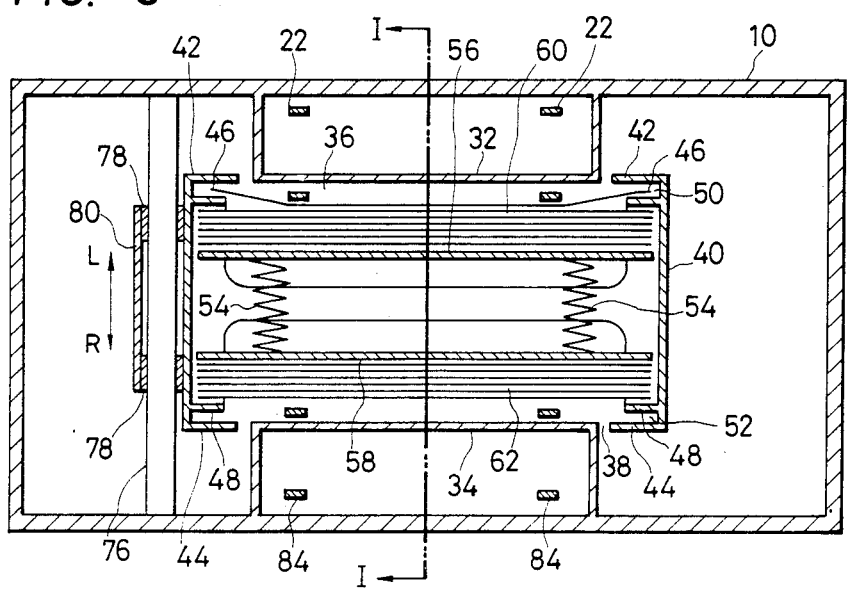
Figure 4:
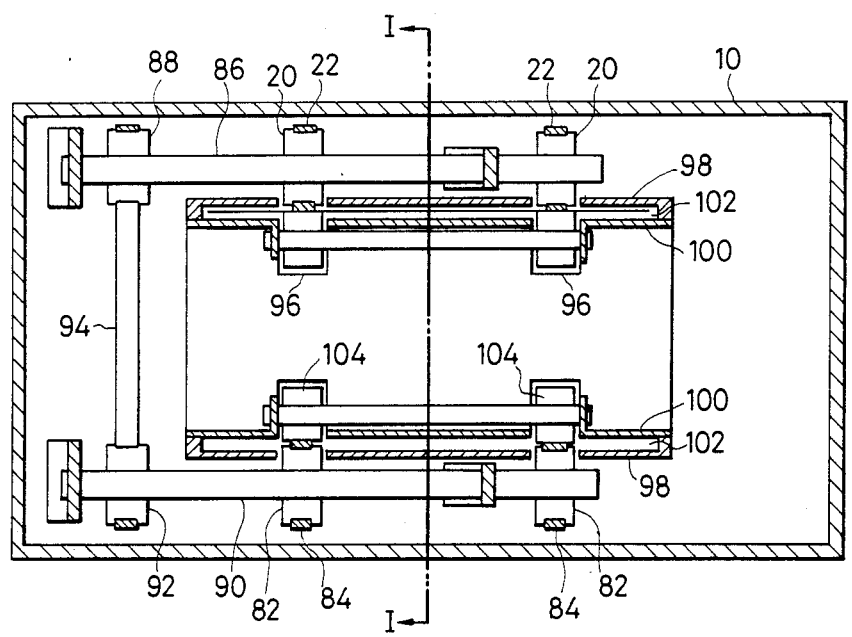

FIG. 1 is a vertical sectional view taken along line I—I of FIGS. 2 through 4 showing the construction of an apparatus for identifying and storing documents embodying the present invention.

The apparatus for identifying and storing document has a casing 10. An inlet 12 for receiving documents to be identified and stored is formed at the upper end of the casing 10. The documents inserted in the inlet 12 are held between a pair of belts 22 stretched on pulleys 14, 16, 18, 20 and rollers 24, 26. The rollers are driven by a driving mechanism (not shown) to convey the documents in the direction of arrow $F_1$. The documents are made to pass through a passage detector 28, including an optical sensor or the like identifying device 30 is installed between the combination of the pulleys 14 and the rollers 24 and the pulleys 16 and the rollers 26, so that the passage of a document and its type are detected. The passage detector 28 produces a document passage detection pulse every time a document passes therethrough.

A projected member 32, roughly U-shaped in cross section and projected from and fixed to the casing 10, is installed between the pulleys 16, 20. Another projected member 34, roughly U-shaped in cross section and projected from and fixed to the face of the casing 10 opposite to the projected member 32, is also installed. A container box 40 having openings 36, 38 wider than the projected members 32, 34 is arranged between the projected members 32, 34. Ribs 46, 48 as partition members are projected from the inner walls of the container box 40 roughly in parallel with its outer edges 42, 44 forming the openings 36, 38 of the container box 40. The outer edges 42 and the ribs 46 form a groove as a first conveyance passageway 50, whereas the outer edges 44 and the ribs 48 form a grove as a second conveyance passageway 52. A pair of partitions 56, 58 are biased away from each other by spring 54 toward the openings 36, 38. The partitions 56, 58 are arranged in the container box 40. A first document containing space 60 is formed between the ribs 46 and the partition 56, whereas a second document containing space 62 is formed between the ribs 48 and the partition 58.

Each pulley 18 is biased by a leaf spring 64 toward the container box 40 and a part extends through an opening in the projected member 32. Part of each pulley 66 also protrudes through an opening in the projected member 34, and the pulley 66 is biased by a leaf spring 68 toward the container box.

As shown in FIG. 2, a container box driving device 72 having a pin 70 is fixed to one inner wall face 71 of the casing 10, that one inner wall face 71 being perpendicular to the walls supporting the projected members 32, 34. The pin 70 is movably inserted in a projected groove 74 extending from one side plate 73 of the container box 40. As shown in FIG. 3, moreover, a guide member 80, roughly semi-circular in cross section, covering the outer peripheral faceof a shaft 76 through a side bush 78, is fixed to the one side plate 73 of the container box 40 in such a manner as to make the container box 40 slidable along the shaft 76 fixed to the casing 10. The container box 40 thus arranged slides in the direction of arrows L or R as the container box driving device 72 rotates.

Pulleys 82 are installed in a position opposite to the pulleys 20 on the side of projected member 34 and a pair of belts 84 are stretched over the pulleys 82, 66.

As shown in FIG. 4, a pulley 88 is fitted to the rotary shaft 86 of the pulleys 20, whereas a pulley 92 is fitted to the rotary shaft 90 of the pulleys 82, and a belt 94 is fitted to the rotary shaft 90 of the pulleys 82, and a belt 94 is stretched over the pulleys 88, 92. Accordingly, when the pulleys 20 are driven to move the belts 22 in the direction; of arrow $F_1$, the pulleys 82 simultaneously move the belts 84 in the direction of arrow $F_2$. The documents passed through the first conveyance passageway 50 are held between the belts 22 abutting against the pulleys 20 and the rollers 96. The documents are passed through connection passageways 102, each being formed between a pair of roughly U-shaped return members 98, 100, and are led to the second passageway 52 while being held in between the belts 84 abutting against the pulleys 82 and the rollers 104.

Figure 5:
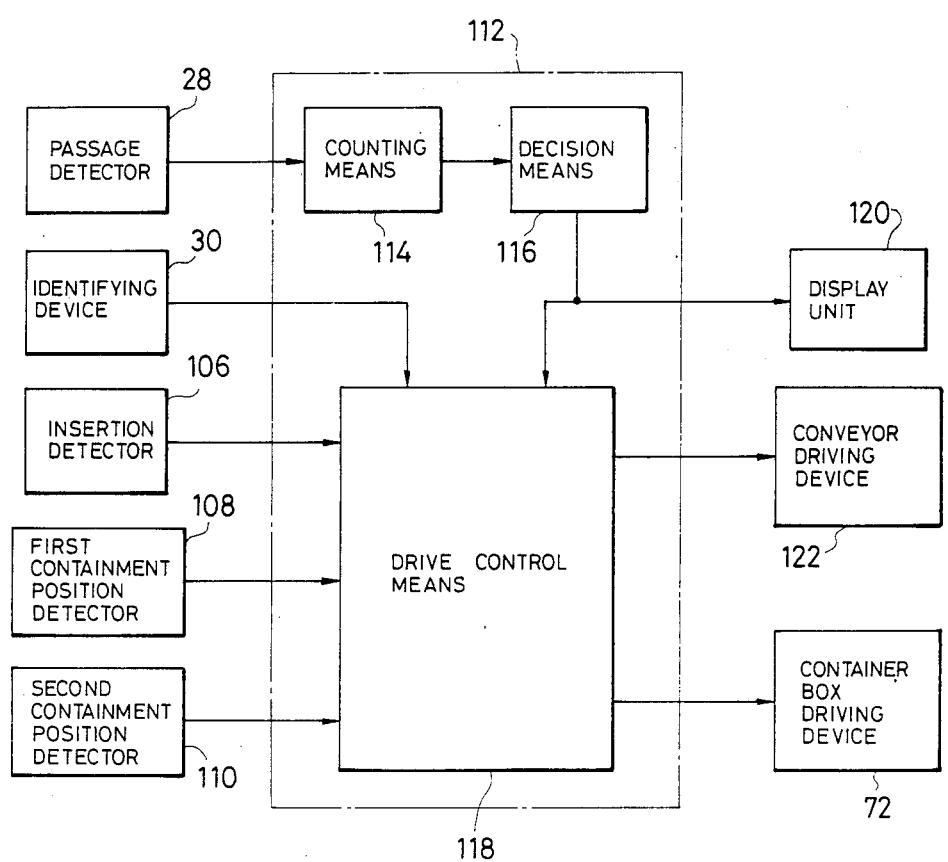
FIG. 5 is a block diagram of a drive control device for controlling the apparatus for identifying and storing documents according to the present invention.

FIG. 5 is a block diagram showing the construction of an embodiment of a drive control device for controlling the above apparatus. Like reference characters are given to like component parts of FIGS. 1 through 4. An insertion detector 106 is installed close to the inlet 12 and used to detect the insertion and discharge of documents, and to produce insertion and discharge detection signals. A first containment position detector 108 is installed close to the port of the first conveyance passageway 50, and is used to detect that the document conveyed through the first conveyance passageway 50 is located in a first containment position. This detector 108 produces a first containment position detection signal. A second containment position detector 110 is installed close to the beginning of the second conveyance passageway 52, and is used to detect that the document conveyed through the second conveyance passageway 52 is located in a second containment position. The detector 110 produces a second containment position detection signal. A control device 112 is formed with a microcomputer and, as its functional means, consists of a counting means 114, a decision means 116 and a drive control means 118. The counting means 114 counts passage detection pulses from the passage detector 28. The decision means 116 supplies a containment limit arrival signal to the drive control means 118 and a display unit 120 when the value counted by the counting means 114 has reached a predetermined document containment limit value. The drive control means 118 controls the driving of a conveyor driving device 122 and the container box driving device 72 in response to control signals from the identifying device 30, indicating whether or not the documents are appropriate and signals indicating the type of documents (first or second type) when they are appropriate. The control signals may also be insertion and discharge detection signals from the insertion detector 106, the first containment position signal from the first containment position detector 108, or the second containment position detection signal from the second containment position detector 110.

FIG. 6 is a flowchart showing an example of the operation of the control device 112 shown in FIG. 5.

Referring to FIGS. 1 through 6, the operation will be described.

When a power supply (not shown) of the apparatus is first turned on, "0" is initially set as the quantity C of documents contained in the container box 40 (Step 201). It is assumed, however, that a containment limit value Cmax, representing the documents containable in the container box 40, is incorporated in a program beforehand. When the papers are inserted through the inlet 12 in the above state, the insertion detector 106 supplies the insertion detection signal to the drive control means 118 (YES in Step 202). On receiving the insertion detection signal, the drive control means 118 causes the conveyor driving device 122 to move the belts 22 in the direction of the arrow $F_1$ (Step 203). The belt 84 is also moved in the direction of the arrow $F_2$ at that time. The documents inserted are held in between the belts 22 and the rollers 24, 26 and are conveyed toward the first conveyance passageway 50. The front edge of the document passes through the passage detector 28 and the identifying device 30. The identifying device 30 first determines whether or not the document passing therein is appropriate (Step 204) and supplies a "right" signal to the drive control means 118 when the document is appropriate, and a "wrong" signal when it is not.

On receiving the "wrong" signal (NO in Step 204), the drive control means 118 causes the conveyor driving device 122 to move the belts 22 in the direction of an arrow B (Step 205) and, on receiving the discharge detection signal from the insertion detector 106 (YES in Step 206), causes the conveyor driving device 122 to stop driving (Step 207) and waits for the insertion of the next document (Step 202).

When the drive control means 118 receives the "right" signal (YES in Step 204), on the other hand, the conveyor driving device 122 allows the document to continue moving in the direction of the arrow $F_1$, and the passage detector 28 supplies a passage detection pulse to the drive control means 118 when the rear edge of the paper passes therethrough (YES in Step 208). On receiving the passage detection pulse, the counting means 114 increments the quantity C of documents contained and sends the quantity C thereof to the decision means 116 (Step 209). The decision means 117 compares the quantity C with the present containment limit value Cmax (Step 210) and, when the quantity C is greater than the containment limit value Cmax (C>Cmax) (YES in step 210), sends the containment limit arrival signal to the drive control means 118 and the display unit 120. On receiving the containment limit arrival signal, the display unit 120 displays that no more documents can be stored (Step 211), while the drive control means 118 moves to Step 205 and returns the document inserted.

When the quantity C is not greater than the containment limit value Cmax (C≦Cmax) (Step 210, the identifying device 30 identifies the documents (Step 212). The result identified (the first or second kind of documents) is supplied to the drive control means 118.

A description will subsequently be given of the operation of the drive control means 118 when it is informed by the identifying device 30 that the paper in question is the first kind thereof.

The documents are conveyed by the conveyor driving device 122 to the first conveyance passageway 50 and, when the rear edge of the document arrives at the flat containment position detector 108, the detector 108 sends the first containment position detection signal to the drive control means 118 (YES in Step 213). On receiving the first containment position detection signal, the drive control means 118 causes the conveyor driving device 122 to stop operation (Step 214) because it has already been informed by the identifying device 30 that the document conveyed is of the first kind thereof. Subsequently, the drive control means 118 allows the container box driving device 72 to slide the container box 40 in the direction of an arrow L (Step 215). Then the document kept stationary in the first conveyance passageway 50, i.e., the first kind of document, is forced over the ribs 46 and into the first document containing space 60. When the operation of storing the document is completed after the container box driving device 72 has turned a half turn, the drive control means 118 stops the operation of the container box driving device 72 and waits for the insertion of the next document (Step 202).

A further description will be given of the operation of the drive control means 118 when it is informed that the document is of the second kind.

The drive control means 118 receives the first containment position detection signal, but since it has already been informed of the fact that the document thus conveyed is classified as the second kind thereof, it keeps the conveyor driving device 122 operating. Consequently, the document, i.e., the second kind thereof is allowed to pass through the first conveyance passageway 50 and is led to the second conveyance passageway 52 through the connection passageway 102. Then the document is conveyed through the second conveyance passageway 52. When it arrives at the second containment position detector 110, the detector 110 sends the second containment position detection signal to the drive control means 118 (YES in Step 216). On receiving the second containment position detection signal, the drive control means 118 stops the operation of the conveyor driving device 122 (Step 217). Subsequently, the drive control means 118 causes the container box driving device 72 to slide the container box 40 in the direction of arrow R (Step 218). At this time, the second kind of paper remaining stationary in the second conveyance passageway 52 is forced over the ribs 48 and stored in the second document containing space 62. When the storage of the document is completed after the container box driving device 72 has made a half turn, the drive control means 118 stops the operation of the container box driving device 72 and waits for the insertion of the next document (Step 202).

Since the container box itself is moved when documents are inserted into the container box, only one driving unit is required. Moreover, the pair of conveyance passageways connected together by means of the connection passageway requires no complicated sorting mechanism as in the case of the conventional apparatus. Further, the attainment of a full condition of documents stored in the container box can be determined simply by detecting the passage of documents and counting the passage detection pulses.

Although the above apparatus embodying the present invention is equipped with a passage detector, it is not always required, provided the proper signal produced by the identifying device are counted by the counting means.

As is obvious from the description given above, documents are stored in the container box by sliding the box, and only one driving device is required for this purpose. Thus, the apparatus for identifying and storing documents according to the present invention can be made more compact, and is inexpensive and simple to construct.

Since the limit of documents containable in the container box is determined by detecting the passage is documents and counting the passage detection pulses, moreover, the apparatus according to the present invention avoids malfunction, and is simpler in construction.

Since documents are sortable by connecting the pair of conveyance passageways together by means of the connection passageway, no complicated sorting mechanism or driving device is required, as conventionally employed. Accordingly, the apparatus according to the present invention can be made more compact, and is inexpensive and simple to construct.

I claim:

1. Apparatus for identifying and storing documents of two different types according to those types, each document including indicia corresponding to the document type, comprising:
   receiving means for receiving documents to be identified and stored;
   identifying means for identifying the type of document received by the receiving means as one of the two types;
   conveying means responsive to the identifying means for conveying documents to be stored to one of two loading position corresponding to each of the two types;
   stationary loading means positioned adjacent each loading position; and
   movable container means including a storage space corresponding to each of the two types for forcing a document to be stored from said one of two loading positions into one of the storage spaces when the container means is moved toward the document.

2. The apparatus of claim 1 wherein the container means includes a pair of wall members defining an enclosed storage area, the wall members having openings therein corresponding to the two loading positions, and a pair of partitions for separating the storage area into the two separate storage spaces.

3. The apparatus of claim 2 wherein the container means also includes means for biasing the partitions away from each other 4. The apparatus of claim 3 wherein the wall members each include a pair of projections for holding documents in the storage spaces against the bias of the biasing means.

5. The apparatus of claim 4 wherein each of the wall members also includes a pair of ribs for holding a document to be stored in said one of two loading positions.

6. The apparatus of claim 5 wherein the container means includes drive means for moving the container means toward the loading means for forcing a document in said one of two loading positions into one of the storage spaces.

7. The apparatus of claim 6 wherein the conveying means includes first and second substantially parallel passageways and a curved connecting passageway, the first passageway including an opening corresponding to one loading position, and the second passageway including an opening corresponding to the other loading position.

8. The apparatus of claim 1 also including detecting means for counting the number of documents conveyed to each of the loading positions, and decision means for generating a limit signal when the number of documents reaches a predetermined level.

9. The apparatus of claim 8 wherein the detecting means includes detection pulse means for generating a pulse signal when each document is conveyed to one of the loading positions, and counting means for counting the pulses from the detection pulse means.

* * * * *